(12) United States Patent
Bodnyk et al.

(10) Patent No.: US 11,656,161 B2
(45) Date of Patent: May 23, 2023

(54) BENDING APPARATUS FOR MATERIAL TESTING AND MICRO—CT IMAGING

(71) Applicant: Ohio State Innovation Foundation, Columbus, OH (US)

(72) Inventors: Kyle Anthony Bodnyk, Ontario, OH (US); Richard T. Hart, Gahanna, OH (US); Alan S. Litsky, Delaware, OH (US)

(73) Assignee: Ohio State Innovation Foundation, Columbus, OH (US)

(*) Notice: Subject to any disclaimer, the term of this patent is extended or adjusted under 35 U.S.C. 154(b) by 0 days.

(21) Appl. No.: 17/470,628

(22) Filed: Sep. 9, 2021

(65) Prior Publication Data

US 2021/0404927 A1     Dec. 30, 2021

Related U.S. Application Data

(62) Division of application No. 16/348,568, filed as application No. PCT/US2017/060506 on Nov. 8, 2017, now Pat. No. 11,143,579.

(Continued)

(51) Int. Cl.
*G01N 3/20*     (2006.01)
*G01N 3/02*     (2006.01)
(Continued)

(52) U.S. Cl.
CPC ............... *G01N 3/20* (2013.01); *G01N 3/00* (2013.01); *G01N 3/02* (2013.01); *G01N 3/08* (2013.01);
(Continued)

(58) Field of Classification Search
CPC .. G01N 3/20; G01N 3/00; G01N 3/02; G01N 3/08; G01N 3/32; G01N 3/34;
(Continued)

(56) References Cited

U.S. PATENT DOCUMENTS

| RE30,848 E | 1/1982 | Bauerkemper |
| 4,864,867 A | 9/1989 | Manahan, Sr. |

(Continued)

FOREIGN PATENT DOCUMENTS

| CN | 101706396 A | * | 5/2010 |
| CN | 101936854 B | * | 6/2012 |
| WO | WO-2022104114 A1 | * | 5/2022 |

OTHER PUBLICATIONS

International Search Report and Written Opinion. Issued by the International Searching Authority (US) in PCT Application No. PCT/US2017/060506 dated Feb. 15, 2018. 10 pages.

(Continued)

*Primary Examiner* — Octavia Davis Hollington
(74) *Attorney, Agent, or Firm* — Meunier Carlin & Curfman LLC

(57) ABSTRACT

A bending apparatus for a sample is disclosed. The bending apparatus includes a translation mechanism that translates a vertical displacement/force into a horizontal displacement/force for bending. Components of the bending apparatus are fabricated from a strong, radiolucent material. In these ways, the bending apparatus is compatible with micro-CT imaging, and as such, may be used to bend a sample during imaging. In a particular application, the bending apparatus may be used to measure biomechanical properties of a bone, such as bone strength, bone material properties, fracture toughness, and fracture propagation.

12 Claims, 6 Drawing Sheets

Related U.S. Application Data

(60) Provisional application No. 62/419,682, filed on Nov. 9, 2016.

(51) Int. Cl.
  G01N 3/08 (2006.01)
  G01N 3/34 (2006.01)
  G01N 3/00 (2006.01)
  G01N 3/32 (2006.01)

(52) U.S. Cl.
  CPC ............... G01N 3/32 (2013.01); G01N 3/34 (2013.01); *G01N 2203/0023* (2013.01); *G01N 2203/0268* (2013.01); *G01N 2203/0641* (2013.01); *G01N 2203/0647* (2013.01)

(58) Field of Classification Search
  CPC ... G01N 2203/0023; G01N 2203/0268; G01N 2203/0641; G01N 2203/0647
  USPC .......................................................... 73/788
  See application file for complete search history.

(56) References Cited

U.S. PATENT DOCUMENTS

| | | | |
|---|---|---|---|
| 5,353,622 A | 10/1994 | Theener | |
| 5,651,283 A | 7/1997 | Runciman et al. | |
| 6,171,812 B1* | 1/2001 | Smith | A01N 1/02 73/818 |
| 8,814,552 B2 | 8/2014 | Fujita et al. | |
| 8,939,995 B2 | 1/2015 | Lechner et al. | |
| 9,091,617 B2* | 7/2015 | Edelman | G01N 3/04 |
| 2002/0170360 A1* | 11/2002 | Anand | G01N 3/20 73/849 |
| 2012/0210801 A1 | 8/2012 | Pettit | |
| 2014/0020507 A1* | 1/2014 | Sasaki | F16H 21/44 74/99 R |
| 2015/0012003 A1 | 1/2015 | Ryan et al. | |
| 2016/0018306 A1* | 1/2016 | Woo | G01N 3/32 73/788 |
| 2021/0215586 A1* | 7/2021 | Shishido | H04N 5/23299 |
| 2022/0287756 A1* | 9/2022 | Lee | A61B 17/92 |

OTHER PUBLICATIONS

Silva, M.J. Bone Mechanical Testing by Three-Point Bending. Washington University Musculoskeletal Structure and Strength Core. May 4, 2016. 4 pages.

Ritchie, R.O, et al. Measurement of the toughness of bone: a tutorial with special reference to small animal studies. Bone. 43 (2008) 798-812.

Zimmermann, et al., The significance of crack-resistance curves to the mixed-mode fracture toughness of human cortical bone, Biomaterials. Jul. 2010; 31(20): 5297-5305.

Zimmermann, et al., Mixed-mode fracture of human cortical bone, Biomaterials 30 (2009) 5877-5884.

Koester, et al. The true toughness of human cortical bone measured with realistically short cracks, NatMat 7, 2008, 672-677.

International Preliminary Report on Patentability issued for Application No. PCT/US2017/060506, dated May 23, 2019, 7 pages.

* cited by examiner

BENDING APPARATUS FOR MATERIAL TESTING AND MICRO—CT IMAGING

CROSS-REFERENCE TO RELATED APPLICATION

This application is a divisional application of U.S. application Ser. No. 16/348,568 filed May 9, 2019, which is a national stage application filed under 35 U.S.C. § 371 of PCT/US2017/060506 filed Nov. 8, 2017, which claims the benefit of U.S. Provisional Application No. 62/419,682, filed Nov. 9, 2016, each of which are hereby fully incorporated by reference in their entireties and made parts hereof.

FIELD OF THE INVENTION

The present disclosure relates to material testing and more specifically, to a bending apparatus that is compatible with micro computed tomography (i.e., Micro-CT) imaging.

BACKGROUND

Generally speaking, the study of bone biomechanics often uses bending measurements to determine structural and material properties, and in some cases, additional information regarding bone fractures may be obtained by imaging a bone sample while bending.

A three point (3-point) bend test is well known and has the advantage of accommodating a variety of bone samples without extensive sample preparation. A disadvantage, however, is that a traditional three-point bending apparatus makes imaging the sample in micro-CT scanner difficult.

A micro-CT scanner creates images of a bone via a collection X-ray cross-sections collected at different angles around the bone. Any apparatus used for bending must not block or obscure the X-rays for any cross-section.

Testing stages for measuring the tensile/compressive strength of a sample during a micro-CT scan are known (e.g., SKYSCAN™ 1172D material testing stage); however, no micro-CT compatible testing stages are available for bending. A need, therefore, exists for an apparatus that measures the structural and material properties (e.g., force, displacement, stiffness, strength, etc.) of a sample during a micro-CT scan.

SUMMARY

Accordingly, in one aspect, the present disclosure embraces a three-point bending apparatus. The apparatus includes two (e.g., fixed) bending pins (i.e., bending supports) that are parallel, spaced a distance apart, and pointed in a first direction (e.g., transvers to a sample's axis). The apparatus also includes a loading pin that is interdigitated (e.g., in zipper-like arrangement) between the two bending pins. The loading pin (i.e., loading cap) is pointed and movable in a second direction that is opposite to the first direction. The apparatus also includes a platen. The platen is parallel to the second direction and located below the pins for bending. The platen is movable in a third direction, towards the bending pins and orthogonal to the second direction. The apparatus also includes a translation mechanism that is connected between the movable loading pin and the platen so that a displacement of the platen in the third direction creates a corresponding (e.g., equal) displacement of the loading pin in the second direction.

The translation mechanism acts to convert displacement and force in one direction (e.g., longitudinal, axial, length-wise, vertical, etc.) to an orthogonal direction (e.g., transverse, cross-wise, horizontal, etc.), and in an exemplary embodiment of the bending apparatus, the force/displacement exerted by the platen is equal to the force/displacement exerted by the loading pin.

The bending apparatus may be used to bend a sample (e.g., a bone). In an exemplary embodiment of the bending apparatus, a bone sample positioned between the loading pin and the two fixed bending pins is bent when the loading pin is moved towards the two fixed bending pins as a result of the platen being moved in the third (i.e., vertical) direction.

In another exemplary embodiment of the bending apparatus, the bending apparatus may be used to bend a bone to breakage and may be used to bend a bone sample during a micro-CT scan. As a result, the material used for the two bending pins, the loading pin, and the force-translation mechanism is structurally stronger than the bone and lucent in X-ray images. One possible material suited for this purpose is polyether ether ketone (i.e., PEEK).

In another exemplary embodiment of the bending apparatus, the loading pin of the bending apparatus is made from two pieces: a cap and a post. The cap, which is connected to the translation mechanism, is hollow (i.e., includes a hollow area) with an opening on one side. The post fits (e.g., slip fit) into the hollow area inside the cap via the opening. Movement of the loading pin is achieved by sliding the cap along the length of the post.

In another exemplary embodiment of the bending apparatus, the translation mechanism of the bending apparatus is made from two pieces. One of the two pieces is a foot that rests on (i.e., is not fixed to) the platen. The other piece is a translation linkage that is connected to the foot and one end and to the cap at the other. The translation linkage is connected to the cap and the foot via movable joints (e.g., pin-joints).

The translation member translates an equivalent force/displacement from the platen to the cap of the loading pin for a variety of angles between the foot and the translation linkage. In an exemplary embodiment of the bending apparatus, the angle between the foot and the translation linkage is greater than 1 degree and less than 90 degrees.

In another aspect, the present disclosure embraces a system for obtaining bone-fracture information. The system includes a testing stage. The testing stage includes a three-point bending mechanism for bending a bone sample. The three-point bending mechanism is mechanically connected to a compression mechanism so that a displacement of the compression mechanism is transferred to an equal but orthogonal displacement of the bending mechanism. The testing stage also includes a load cell that senses force on the compression mechanism, which due to the translation mechanism, is the same as the force on the bending mechanism. The system also includes a micro-CT scanner for imaging the bone sample while it is bent and while the bending forces are measured. A computing device is also included in the system. The computing device is communicatively coupled (e.g., via a data communication link) to the testing stage and the micro-CT scanner. The computing device includes a processor that is configured by software instructions to perform a method for obtaining bone fracture information. In the method, signals are sent to the testing stage to incrementally bend the bone sample until it breaks. At each increment, the processor obtains force data from the load cell and CT-images from the micro-CT scanner. After breakage, the force data and CT-images are processed to obtain bone-fracture information.

In exemplary embodiments of the system, the bone-fracture information may include measurements of fracture toughness, stress, or strain. In addition, the bone fracture information may include three-dimensional images of fracture propagation.

In another exemplary embodiment of the system, the bone sample is a mouse bone, such as a femur.

In another exemplary embodiment of the system, the three-point bending mechanism and the translation mechanism of the testing stage are polyether ether ketone (PEEK) plastic, which is both strong and radio lucent.

In another exemplary embodiment of the system, the translation mechanism of the testing stage is a Scott-Russell linkage.

In another aspect, the present disclosure embraces a testing stage for simultaneously applying equal compression and bending forces on a sample. The testing stage includes a compressor with a compressing force member that, when moved vertically, applies a vertical force on the sample. The testing stage also includes a three-point bender with a bending member that, when moved horizontally, applies a horizontal force on the sample. The testing stage also includes a translation mechanism that links the vertical movement with the horizontal movement so that equal vertical and horizontal forces are simultaneously applied to the sample.

In an exemplary embodiment of the testing stage, the translation mechanism is a Scott-Russel linkage.

In another exemplary embodiment of the testing stage, the three-point bender and the force translation mechanism are radiolucent materials that are compatible with X-ray computed tomography (CT) imaging. In this case, the testing stage may be used to position and rotate a mouse femur in a micro-CT scanner for imaging.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale, and like reference numerals designate corresponding parts throughout the figures and views.

DETAILED DESCRIPTION

Material testing via bending and/or compression is an important aspect of bone biomechanics research. Bending, for example, is a way to determine the strength, material properties and/or fracture toughness of a bone sample (i.e., bone). One bone sample that is useful in bone biomechanics research (e.g., as a clinical surrogate for human bone) is the mouse femur. The mouse femur is elongated and cylindrically shaped, making it well suited for imaging and bending.

Figure 1:
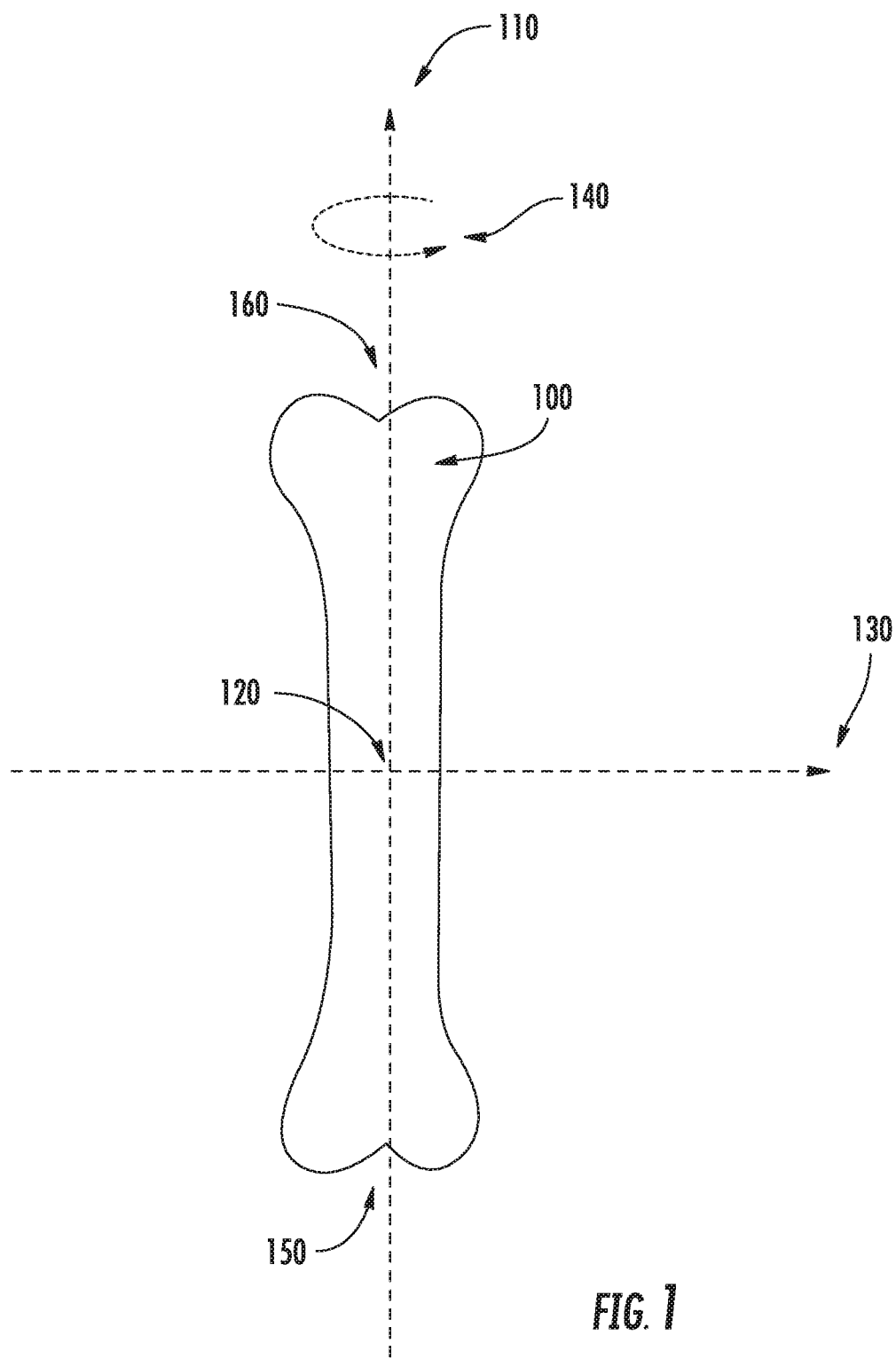
FIG. 1 graphically depicts a sample for testing and a defined coordinate system according to an embodiment of the present disclosure.

A graphical illustration of the bone sample is shown in FIG. 1. For the bone sample 100, a set of axes, directions, and points may be defined. A vertical (i.e., longitudinal, axial, length-wise) axis 110 runs length-wise through the center 120 of the bone. A vertical direction runs from the bottom of the bone 150 to the top 160 of the bone. A horizontal (i.e., transverse, cross-wise) axis 130 runs cross-wise through the center 120 of the bone and is orthogonal with the vertical axis 110. The horizontal direction, in relation to the vertical direction is illustrated by the arrow on the horizontal axis 130, as shown in FIG. 1. The bone may be rotated about the vertical axis so that a point on the bone's surface traces an angle (i.e., rotates) 140 about the vertical axis 110.

Further information about the material properties of a bone sample 100 may be obtained from images acquired during bending. For example, fracture geometry and propagation may be obtained from an examination of the images. Images may be correlated with force/displacement results during bending to measure strain, stress, bending stiffness, fracture toughness, and other mechanical values.

An imaging modality well suited for obtaining information about bone fractures resulting from bending is micro computed tomography (i.e., micro-CT). Micro-CT produces a three-dimensional (3D) high-resolution (e.g., microscopic) image of the bone that is reconstructed from a series of views (i.e., projections) that are obtained as either the sample or the micro-CT scanner is rotated.

Figure 2:
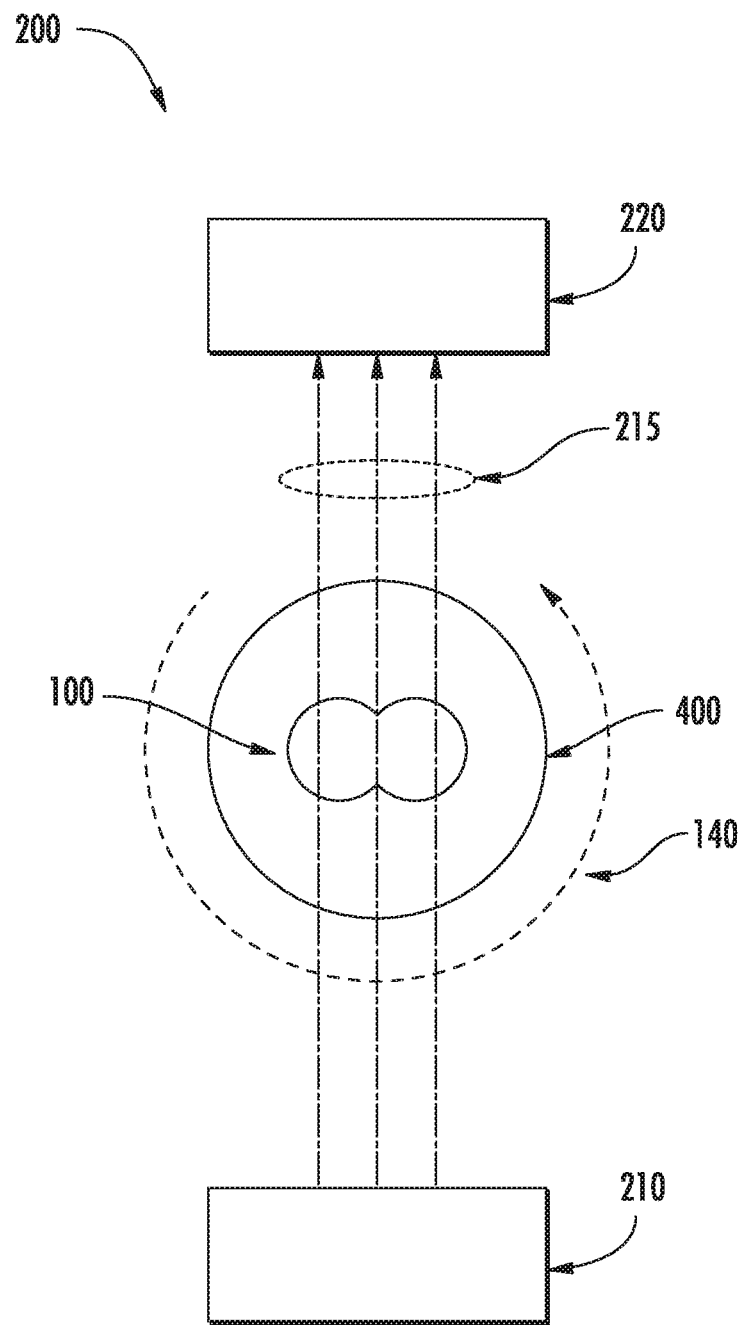
FIG. 2 graphically depicts a top view of micro-CT image acquisition according to an embodiment of the present disclosure.

FIG. 2 graphically depicts a simplified micro-CT imaging acquisition setup. The micro-CT scanner 200 includes an X-ray source 210 that projects X-rays 215 towards an X-ray detector 220 to capture a projection image of the bone sample 100. The bone sample 100 is typically mounted to a test stage 400 (i.e., testing stage) that supports and positions the bone sample for imaging. A series of projection images may be gathered by incrementally rotating 140 (e.g., using the test stage 400) the sample about its vertical axis 110 and capturing (e.g., using the X-ray detector 220), a projection image at each increment. A 3-D image of the object may then be reconstructed from the series of projection images using a computing device (not shown) connected to the X-ray source 210, X-ray detector 220, and test stage 400.

The testing stage 400 used for imaging must hold the bone sample 100 in the imaging field of view. Typically, the testing stage 400 automatically rotates the bone using a stepper motor controlled by the computing device that also controls the image acquisition process. Micro-CT scanners typically have a small field of view and in order to get clear images, the thickness of a bone sample 100 should be similar during rotation 140. To achieve similar thickness at all rotation angles, the bone sample ICO is usually rotated about its vertical axis 110.

A movable platen may be integrated as part of the testing stage. Compression of the bone along its vertical axis is accomplished by moving the platen upwards against the bottom 150 of the bone, while the top 160 of the bone is held in place by a holder or rigid plate. Because the movable platen and the holder (or rigid plate) are located at the bottom 150 and top 160 of the bone 100 respectively, they do not interfere with micro-CT imaging (e.g., block X-rays), even as the bone is rotated 140 about its vertical 110 axis.

A bone 100 may be bent by moving a loading pin horizontally 130 against one side of the bone (e.g., at the bone center 120). At the same time, the bone is held in place on the side opposite to the loading pin by two bending pins located above and below the loading pin. The resulting forces from the three pins bends the bone (i.e., three-point bending).

Integrating a three-point bending mechanism into a micro-CT setup is complicated by the requirement that the bending mechanism/apparatus not block, or otherwise obscure, the X-rays 215 from reaching the detector 220 as the bone sample 100 is rotated 140 about its vertical 110 axis.

The present disclosure addresses the problem of integrating a three-point bending mechanism with a testing stage for micro-CT imaging in two ways. First, the bending pins and support structure are constructed using material that is both (i) a radiolucent (i.e., substantially transparent to X-rays) and (ii) strong enough to accept the forces necessary to bend a bone sample (e.g., to the point of breakage) without deforming or breaking. Second, a translation mechanism, also fabricated from radiolucent material, is used to translate the vertical displacement/force of the platen into a horizontal displacement/force applied to the loading pin. This translation of displacement/force allows any electronics, motors, sensors, or other radio-opaque materials associated with the bending mechanism to be contained in the testing stage, below the platen, and out of the field of view of the micro-CT imaging.

A plurality of radiolucent materials may be used with micro-CT. One material that has good strength and is transparent to X-rays is polyether ether ketone (PEEK) plastic. PEEK is strong, with a Young's modulus of approximately 3.6 Giga-Pascals (GPa), and can bend/break a bone without suffering substantial deformation or breakage. For example, the Young's modulus of a mouse femur is roughly 1.9 GPa, and because the bone is "hollow," it is much weaker than the PEEK plastic. The force necessary to break a mouse femur is in the (approximate) range of 9 Newtons (N) to 25 N, which may depend on the age of the mouse.

Figure 3:
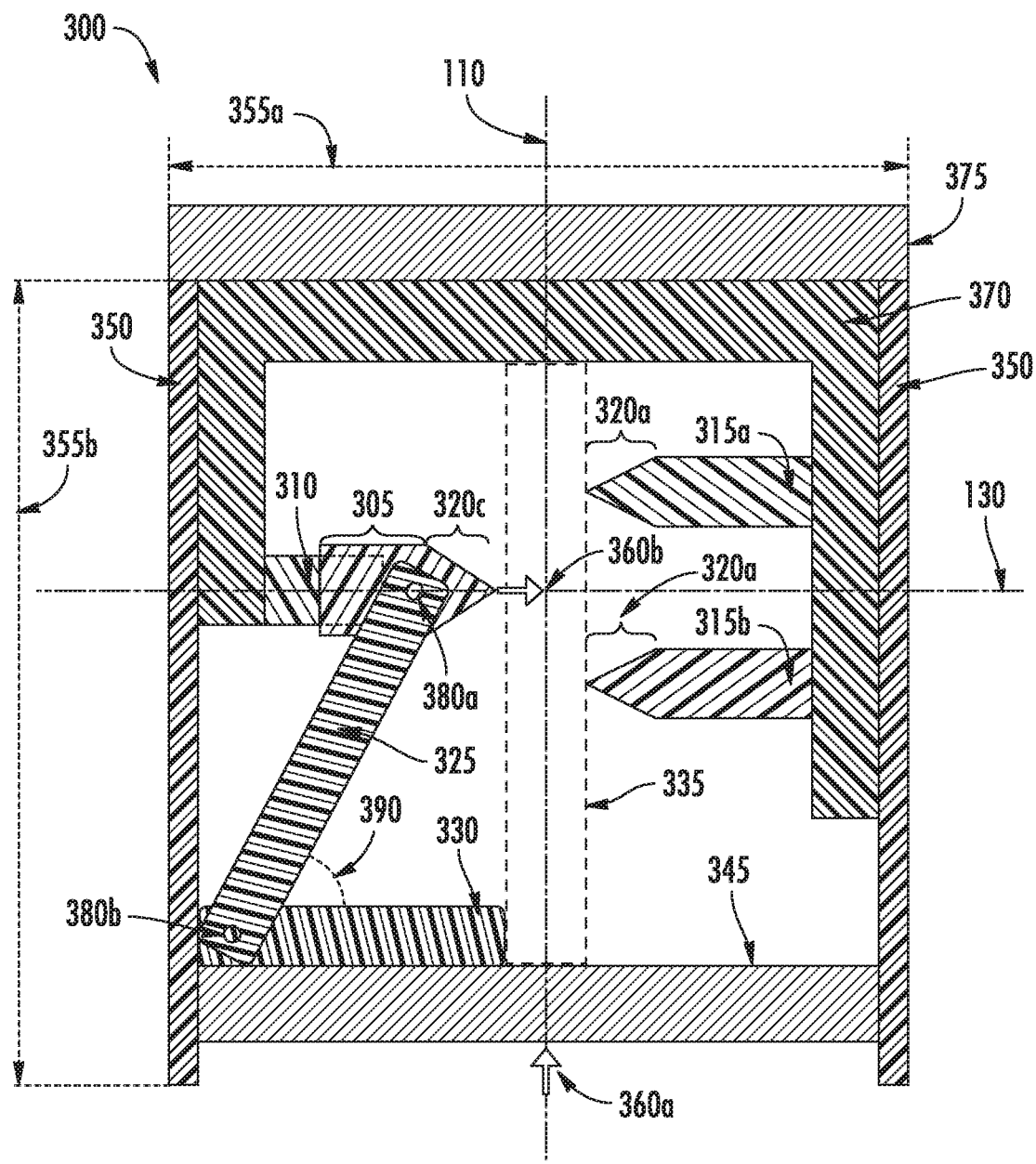
FIG. 3 graphically depicts a side view of a bending apparatus according to an embodiment of the present disclosure.

FIG. 3 graphically depicts a side view of a three-point bending apparatus 300 having the features described above. The apparatus includes two bending pins 315a, 315b interdigitated with a loading pin, as described previously. The loading pin may be composed of a post 310 (i.e., fixed loading guide) and a hollow cap 305 (i.e., loading cap) fit over the post through an opening that is sized so that the cap 305 can slide along the post 310 in a horizontal direction 360b. The pins have ends 320a, 320b, 320c that may be shaped to bend and/or adapt to the bone. As shown, the ends 320a, 320b, 320c are pointed but could be virtually any shape including (but not limited to) rounded, square, notched, or knurled. The pins are connected (e.g., formed for a single piece, fastened, glued, etc.) to a bender body 370 that adapts the 3-point bender to a sample holder 350 and to the top 375. The sample holder 350 (i.e., sample chamber) is typically a cylindrical tube that is constructed from a radiolucent and visually transparent material such as Poly Methyl Methacrylate (PMMA). The bender body 370 may also attach or adapt to a top 375. The apparatus includes a platen 345 that is movable within the sample holder 350. In an exemplary embodiment, the platen 345 and the top 375 may be used to hold and/or compress a bone sample placed in the sample area 335.

As shown in FIG. 3, a translation mechanism is used to convert a vertical displacement/force 360a of the platen 345 into a horizontal displacement/force 360b of the loading pin (i.e., cap 305). The translation mechanism includes a foot 330 that rests on the platen 345. The foot 330 is connected to one end of a translation linkage 325 (i.e., link) via a hinged joint 380b (e.g., pin-hinge). The other end of the translation linkage 325 is connected to the cap 305 via a movable (i.e., hinged) joint 380a (e.g., pin-hinge). The translation member's horizontal movement is limited by the sample holder 350, a raised lip along the circumference of the platen 345, or virtually any means to halt the foot 330 in the horizontal direction; and the horizontal movement of the cap 305 is constrained by the post's 310 length. Thus, as the platen is displaced vertically, the angle 390 between the foot 330 and the translation member 325 is changed, thereby producing an equal horizontal displacement of the cap 305.

The translation mechanism illustrated in FIG. 3 is an embodiment of a Scott-Russell linkage, and as such, the particular dimensions, shapes, and connection points, of the elements may vary as long as the operation follows the principles of the Scott-Russell linkage. For example, the foot 330 may be any length because the important linkage feature for bending is the location of the hinge 380b (i.e., pin).

The vertical 355b and horizontal 355a dimensions of the bending apparatus accommodate the size of the bone sample and the imaging area of the micro-CT scanner.

Figure 4:
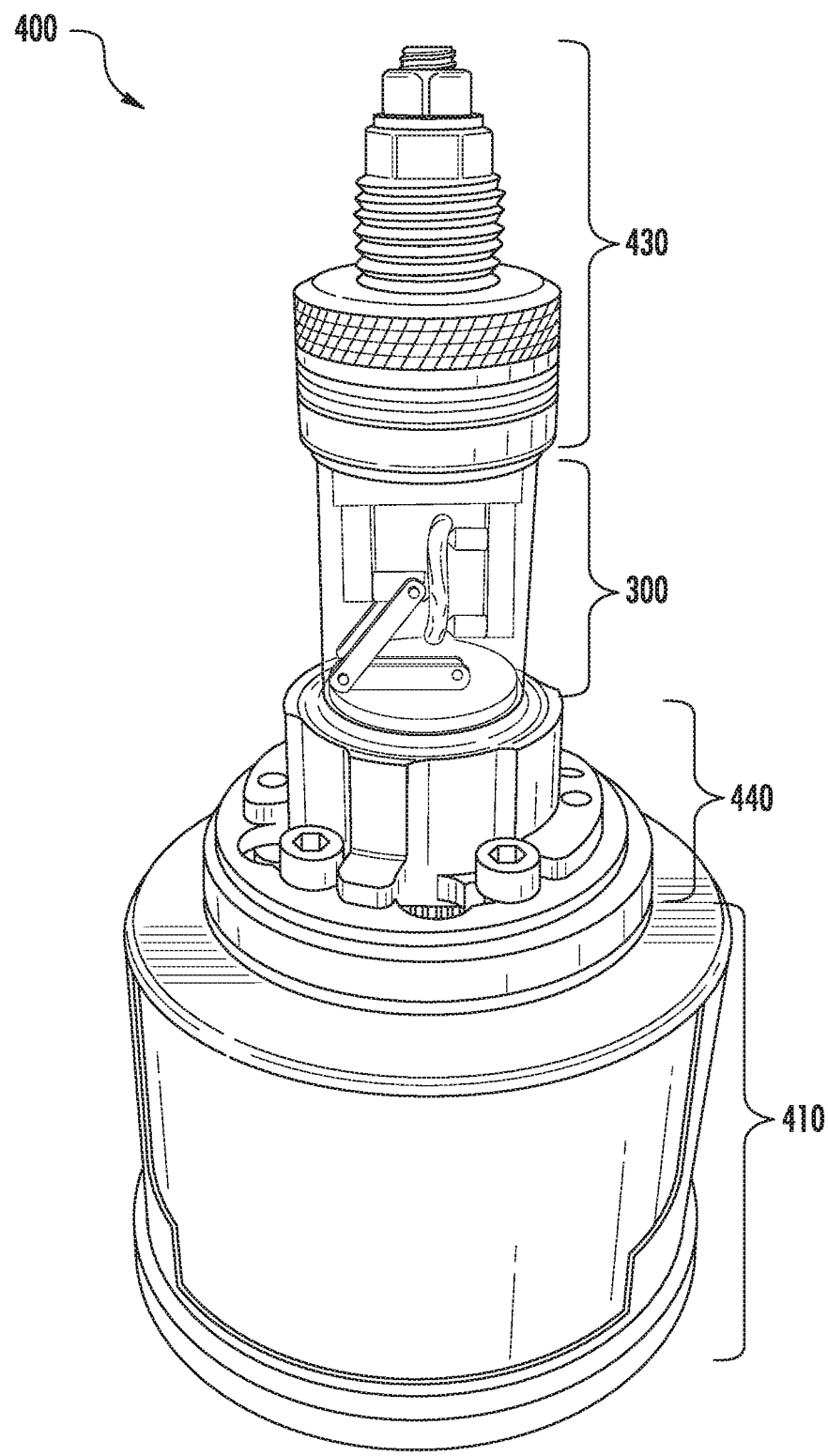
FIG. 4 graphically depicts a perspective view of a testing stage according to an embodiment of the present disclosure.

An exemplary testing stage with an integrated bending apparatus is shown in FIG. 4. The testing stage includes the bending apparatus 300 as described previously. As shown, the bending apparatus may connect to an adjustable top assembly 430 that includes mounting hardware to adapt with other aspects of the micro-CT or for other purposes (e.g., hold a sample for tensile strength testing). Also as shown, the bending apparatus may connect to a bottom assembly 440 that in turn, is connected to a base 410. The base 410 contains all electronics needed for (i) controlling the drivetrain (e.g., to move the platen 345), (ii) sensing data (e.g., from a load cell coupled to the platen 345) and (iii) communicating with other systems/software. For example, the base may include a stepper motor, planetary gearbox, and drivetrain to move the platen vertically. The base may also include a displacement sensor for measuring small (e.g., micrometer) displacements of the platen. The base may also include a load sensor that measures loads (i.e., forces on the platen). Thus one base may be used for both compression measurements and bending measurements because of the translation mechanism which converts compression (i.e., vertical) displacements/forces into bending (i.e., horizontal) displacements/forces and vice versa. As a result, in a possible embodiment of the testing stage, the bone sample may be simultaneously bent and compressed with equal displacement/forces.

Figure 5:
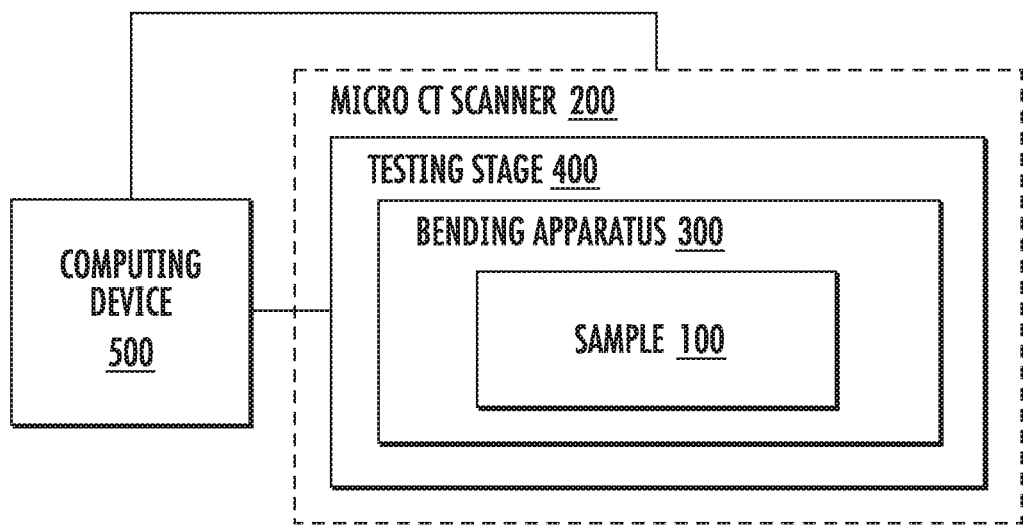
FIG. 5 graphically depicts a block diagram of system for obtaining bone-fracture information according to an embodiment of the present disclosure.

FIG. 5 graphically depicts a block diagram of system for obtaining bone-fracture information. A bone sample 100, is position in, and bent by, a bending apparatus 300. The bending apparatus 300 is driven by a movable platen that is controlled and sensed by a testing stage 400. The testing stage 400 is positioned in a micro-CT scanner 200 and rotates the sample so that it may be imaged (while bending). A computing device 500, with a processor configured by software, controls/monitors the bending and imaging operations, and processes the results to determine the material properties of the sample, which include bone-fracture information.

Figure 6:
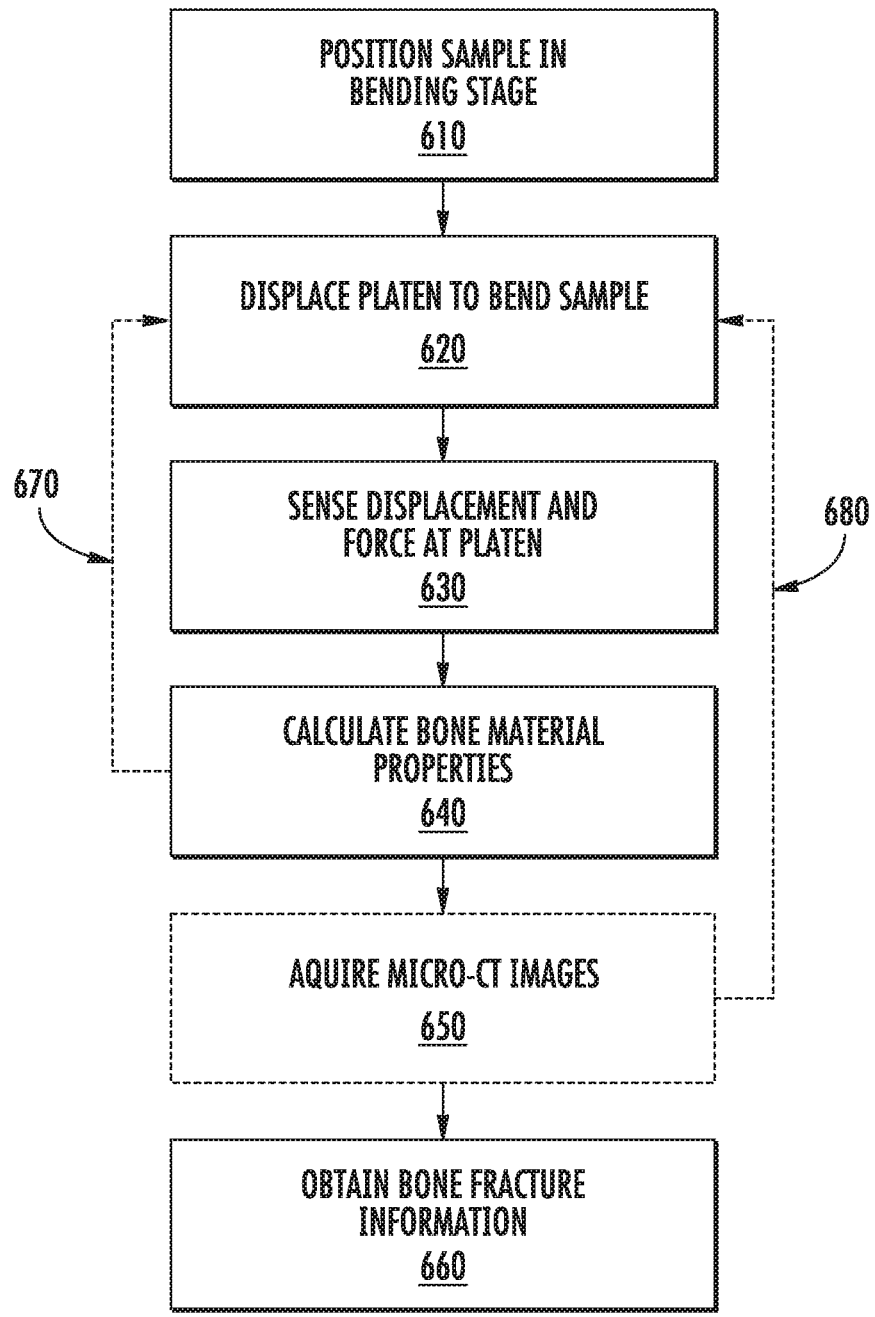
FIG. 6 method for obtaining bone-fracture information according to an embodiment of the present disclosure.

FIG. 6 graphically depicts a method for obtaining bone-fracture information. The method includes positioning 610 a sample (e.g., a bone) in a bending stage. The platen of the bending stage is then displaced 620 vertically to apply a horizontal bending force on the sample. The bending force/ displacement on the sample is then sensed 630 at the platen. Using the sensed force/displacement data, bone material properties (e.g., stress, strain, toughness, etc.) are be calculated 640. In addition, a 3D set of micro-CT images may be acquired 650 to obtain 660 bone fracture information.

The process described thus far may be repeated 670, 680. In other words, the platen may be incrementally displaced to incrementally bend the sample. At each increment, force/displacement data and micro-CT images (e.g., with a 2.98 micron pixel size) may be obtained. This incremental bending and obtaining data/images may continue until the sample breaks or until some specified condition has been met (e.g., maximum bending displacement or until the bone fractures unstably). At the conclusion of the repeated process, bone-fracture information may be obtained 660, which including images indicating the propagation of fractures. Software (e.g., NRECON™) may be used to reconstruct images from the CT raw scan data. Software (e.g., SCANIP™) may also be used to segment the bone images from the background for better visualization.

The visualization of whole bone 3D fracture (e.g., Mode I) propagation may facilitate an understanding on how fractures occur, which could be used for an evaluation of treatment therapies.

While the present disclosure details the instructive embodiment of bending a bone sample for micro-CT imaging, the apparatus and methods described herein are not limited to this particular embodiment. For example, the bending apparatus disclosed may be adapted (e.g., scaled) to allow for testing of a variety of possible samples. More generally, the present disclosure is suitable for adapting the axial movement of any compression testing device into a transverse load applied to a sample (e.g., for bending).

In the specification and/or figures, typical embodiments have been disclosed. The present disclosure is not limited to such exemplary embodiments. The use of the term "and/or" includes any and ail combinations of one or more of the associated listed items. Unless otherwise noted, specific terms have been used in a generic and descriptive sense and not for purposes of limitation.

The invention claimed is:

1. A system for obtaining bone-fracture information, the system comprising:
   a testing stage bending a bone sample, wherein the testing stage comprises:
      a three-point bending mechanism and a compression mechanism that are mechanically connected via a translation mechanism so that a displacement of the compression mechanism is transferred to an equal but orthogonal displacement of the bending mechanism, and
      a load cell that senses a force on the compression mechanism, wherein the translation mechanism transfers a force on the bending mechanism to the compression mechanism;
   a micro-CT scanner imaging the bone sample during the bending and sensing;
   a computing device that is communicatively coupled to the testing stage and the micro-CT scanner, the computing device comprising a processor that is configured by software instructions to:
      send signals to the testing stage to incrementally bend the bone sample until breakage;
      obtain force data, at each bend increment, from the load cell;
      obtain CT-images, at each bend increment, from the micro-CT scanner; and
      after breakage, process the force data and CT-images to obtain bone-fracture information.

2. The system for obtaining bone-fracture information according to claim 1, wherein the bone-fracture information comprises a fracture toughness measurement.

3. The system for obtaining bone-fracture information according to claim 1, wherein the bone-fracture information comprises a stress or strain measurement.

4. The system for obtaining bone-fracture information according to claim 1, wherein the bone-fracture information comprises three-dimensional images of fracture propagation.

5. The system for obtaining bone-fracture information according to claim 1, wherein the bone sample is a femur of a mouse.

6. The system for obtaining bone-fracture information according to claim 1, wherein the three-point bending mechanism and translation mechanism are polyether ether ketone (PEEK) plastic.

7. The system for obtaining bone-fracture information according to claim 1, wherein the translation mechanism is a Scott-Russell linkage.

8. A testing stage for simultaneously applying equal compression and bending forces on a sample, the fixture comprising:
   a compressor having compressing member that moved vertically to apply a vertical force on the sample;
   a three-point bender having a bending member that is moved horizontally to apply a horizontal force on the sample;
   a translation mechanism that links the vertical movement with the horizontal movement so that equal vertical and horizontal forces are simultaneously applied to the sample, wherein the translation mechanism transfers a force on the three-point bender to the compressing member; and
   a load cell that senses a force on the compressing member.

9. The testing stage according to claim 8, wherein the translation mechanism is a Scott-Russel linkage.

10. The testing stage according to claim 8, wherein the three-point bender and the translation mechanism are radiolucent materials compatible with X-ray computed tomography (CT) imaging.

11. The testing stage according to claim 10, wherein the testing stage rotates a mouse femur in a micro-CT scanner for imaging.

12. The testing stage according to claim 8, further comprising:
   a micro-CT scanner imaging the sample during the application of the vertical force and the horizontal force on the sample; and
   a computing device that is communicatively coupled to the testing stage and the micro-CT scanner, the computing device comprising a processor that is configured by software instructions to:
      send signals to the testing stage to incrementally apply the vertical force and the horizontal force on the sample until breakage;
      obtain force data, at each force increment, from the load cell;
      obtain CT-images, at each force increment, from the micro-CT scanner; and
      after breakage, process the force data and CT-images to obtain sample-fracture information.

* * * * *